United States Patent
Hu et al.

(10) Patent No.: US 11,427,211 B2
(45) Date of Patent: Aug. 30, 2022

(54) METHODS FOR HANDLING SENSOR FAILURES IN AUTONOMOUS DRIVING VEHICLES

(71) Applicant: Baidu USA LLC, Sunnyvale, CA (US)

(72) Inventors: Jiangtao Hu, Sunnyvale, CA (US); Yifei Jiang, Sunnyvale, CA (US); Dong Li, Sunnyvale, CA (US); Liangliang Zhang, San Jose, CA (US); Jiaming Tao, Sunnyvale, CA (US); Qi Luo, Sunnyvale, CA (US); Xiangquan Xiao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 467 days.

(21) Appl. No.: 16/011,526

(22) Filed: Jun. 18, 2018

(65) Prior Publication Data
US 2019/0382031 A1    Dec. 19, 2019

(51) Int. Cl.
| | |
|---|---|
| *B60W 50/029* | (2012.01) |
| *B60W 50/02* | (2012.01) |
| *G06V 20/58* | (2022.01) |
| *G05D 1/00* | (2006.01) |
| *G05D 1/02* | (2020.01) |
| *G06V 20/56* | (2022.01) |

(52) U.S. Cl.
CPC ...... *B60W 50/029* (2013.01); *B60W 50/0205* (2013.01); *G05D 1/0077* (2013.01); *G05D 1/0088* (2013.01); *G05D 1/0246* (2013.01); *G06V 20/58* (2022.01); *G06V 20/588* (2022.01); *B60W 2050/0215* (2013.01); *B60W 2050/0292* (2013.01); *B60W 2420/42* (2013.01); *B60W 2420/52* (2013.01); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 9,201,424 B1 * | 12/2015 | Ogale | G06T 7/80 |
| 9,519,832 B2 * | 12/2016 | Lee | G06K 9/00791 |
| 9,898,928 B1 * | 2/2018 | Payne | G08G 1/09626 |
| 10,423,934 B1 * | 9/2019 | Zanghi | G05D 1/0225 |

(Continued)

FOREIGN PATENT DOCUMENTS

| | | |
|---|---|---|
| JP | 4205403 | 7/1992 |
| JP | 2008216226 | 9/2008 |

(Continued)

*Primary Examiner* — Christian Chace
*Assistant Examiner* — Amelia Vorce
(74) *Attorney, Agent, or Firm* — Womble Bond Dickinson (US) LLP (57) ABSTRACT

According to some embodiments, described herein is a system and method for handling sensor failures in autonomous driving vehicles (ADV) that is navigating in a world coordination as an absolute coordination system. When the ADV encounters a sensor failure, but still has at least one camera working properly, the sensor failure handling system can switch the ADV from navigating in the world coordination to a local coordination, in which the ADV relies camera-based obstacle detection and lane mark detection to drive safely until human dis-engagement or until the ADV is parked along a road side.

21 Claims, 8 Drawing Sheets

(56) References Cited

U.S. PATENT DOCUMENTS

| | | | |
|---|---|---|---|
| 10,551,849 B2* | 2/2020 | Agarwal | G08G 1/096783 |
| 2010/0292886 A1* | 11/2010 | Szczerba | G01S 13/723 |
| | | | 701/31.4 |
| 2015/0120138 A1* | 4/2015 | Zeng | G01S 7/4808 |
| | | | 701/41 |
| 2015/0298654 A1* | 10/2015 | Joao | G01S 19/13 |
| | | | 701/2 |
| 2018/0075745 A1* | 3/2018 | Buburuzan | G08G 1/161 |
| 2018/0107215 A1* | 4/2018 | Djuric | G06N 3/04 |
| 2018/0268566 A1* | 9/2018 | Houts | G06T 7/74 |
| 2018/0281785 A1* | 10/2018 | Berntorp | G08G 1/161 |
| 2019/0027040 A1* | 1/2019 | Ogawa | B60R 21/00 |
| 2019/0070957 A1* | 3/2019 | Nakatsuka | B60K 28/06 |
| 2019/0072641 A1* | 3/2019 | Al-Stouhi | G01S 13/931 |
| 2019/0113916 A1* | 4/2019 | Guo | B60W 60/0015 |
| 2019/0156131 A1* | 5/2019 | Akiyama | G06K 9/00791 |
| 2019/0196481 A1* | 6/2019 | Tay | G01S 17/86 |
| 2019/0271549 A1* | 9/2019 | Zhang | G05D 1/0088 |
| 2019/0271551 A1* | 9/2019 | Stess | G01C 21/32 |
| 2019/0273909 A1* | 9/2019 | Ye | G01B 11/14 |
| 2019/0291748 A1* | 9/2019 | Takahashi | B60W 50/14 |
| 2019/0304097 A1* | 10/2019 | Eade | G01C 21/32 |
| 2019/0318633 A1* | 10/2019 | Huang | G08G 5/0021 |
| 2019/0361457 A1* | 11/2019 | Johnson | B63H 25/00 |
| 2019/0367012 A1* | 12/2019 | Matta | G05D 1/0234 |
| 2019/0374151 A1* | 12/2019 | Paudel | A61B 5/7267 |
| 2019/0384294 A1* | 12/2019 | Shashua | G08G 1/096805 |
| 2019/0387060 A1* | 12/2019 | Kentley-Klay | H04L 67/306 |

FOREIGN PATENT DOCUMENTS

| | | | |
|---|---|---|---|
| JP | 2016192028 | 11/2016 | |
| WO | 2012131764 | 10/2012 | |
| WO | WO-2018086133 A1 * | 5/2018 | G01B 11/14 |

* cited by examiner

METHODS FOR HANDLING SENSOR FAILURES IN AUTONOMOUS DRIVING VEHICLES

TECHNICAL FIELD

Embodiments of the present disclosure relate generally to operating autonomous driving vehicles. More particularly, embodiments of the disclosure relate to handling sensor failures in autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

When all the onboard sensors work as expected, an autonomous driving vehicle (ADV) relies on sensor fusion of one or more GPS sensors and one or more LIDAR sensors for navigating in a world coordination, e.g., absolute coordinates such as longitudes and latitudes. With a high definition map, an ADV can generate a smooth planning trajectory to avoid collisions with obstacles.

However, when the ADV encounters a failure in one or more sensors, the ADV navigating in a world coordination may not receive any sensor data or experience delays in receiving sensor data from one or more sensors. Accordingly, the ADV may not be able to navigate accurately in a world coordination.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment may be included in at least one embodiment of the disclosure. The appearances of the phrase "in one embodiment" in various places in the specification do not necessarily all refer to the same embodiment.

According to some embodiments, described herein is a system and method for handling sensor failures in autonomous driving vehicles (ADV) that is navigating in a world coordination as an absolute coordination system. When the ADV encounters a sensor failure, but still has at least one camera working properly, the sensor failure handling system can switch the ADV from navigating in the world coordination to a local or relative coordination, in which the ADV relies on one or more cameras to navigate using lane tracking, so that the ADV can slow down until human disengagement, or pull up alongside a street when appropriate. The sensor failure handling system can perform the coordination switch swiftly, seamlessly and automatically.

In one embodiment, a sensor failure module can be provided in the ADV, to detect a sensor failure in one or more sensors in the ADV that is navigating in a world coordinate system. In response to detecting the failure in the one or more sensors, the sensor failure module sends a message indicating the failure to a message channel that is subscribed to by one or more modules in the ADV. At least one subscribing module, when receiving the message, operates to switch the ADV from navigating in the world coordination to a local coordination that is relative to a current location of the ADV within a lane in which the ADV is driving. The at least one subscribing modules can plan a trajectory to drive the ADV within the lane based on the local coordination without using absolute coordinate information of the world coordination.

As used herein, a sensor failure can be a physical failure in a sensor, or a perceived failure of a sensor from the perspective of a recipient of sensor data. For example, when a GPS signal is blocked, even if a GPS sensor does not have a physical failure, the ADV would not be able to use sensor data from the GPS sensor, the sensor failure handling module would consider the lack of GPS signals or errors of GPS signals as a failure in the GPS sensor, and would send a message to the message channel. As an another example, when high utilization of computing resources in a computing device prevents the computing device to timely process sensor data from a sensor, which results in a delay for sensor data to be received by an appropriate module, the sensor failure handling module similarly would consider this delay as a sensor failure.

In one embodiment, the sensor failure handling module is configured to monitor a temperature of the ADV, CPU utilization, memory utilization and disk utilization on a computing device in the ADV, and sensors in the ADV. As such, the sensor failure handling module can detect a sensor failure, and also can identify one or more causes for the sensor failure. When sending a message indicating a sensor failure to the message channel, the sensor failure handling module can send metadata specifying the causes of the failure. The metadata can be used by a subscribing module to determine whether that subscribing module should handle the sensor failure. If no subscribing module can handle the sensor failure, the sensor failure handling module by default would handle the sensor failure. For example, if disk utilization on a computing device is too high when a sensor failure is detected, the sensor failure handling module itself may operate to free some disk space.

Autonomous Driving Vehicles

Figure 1:
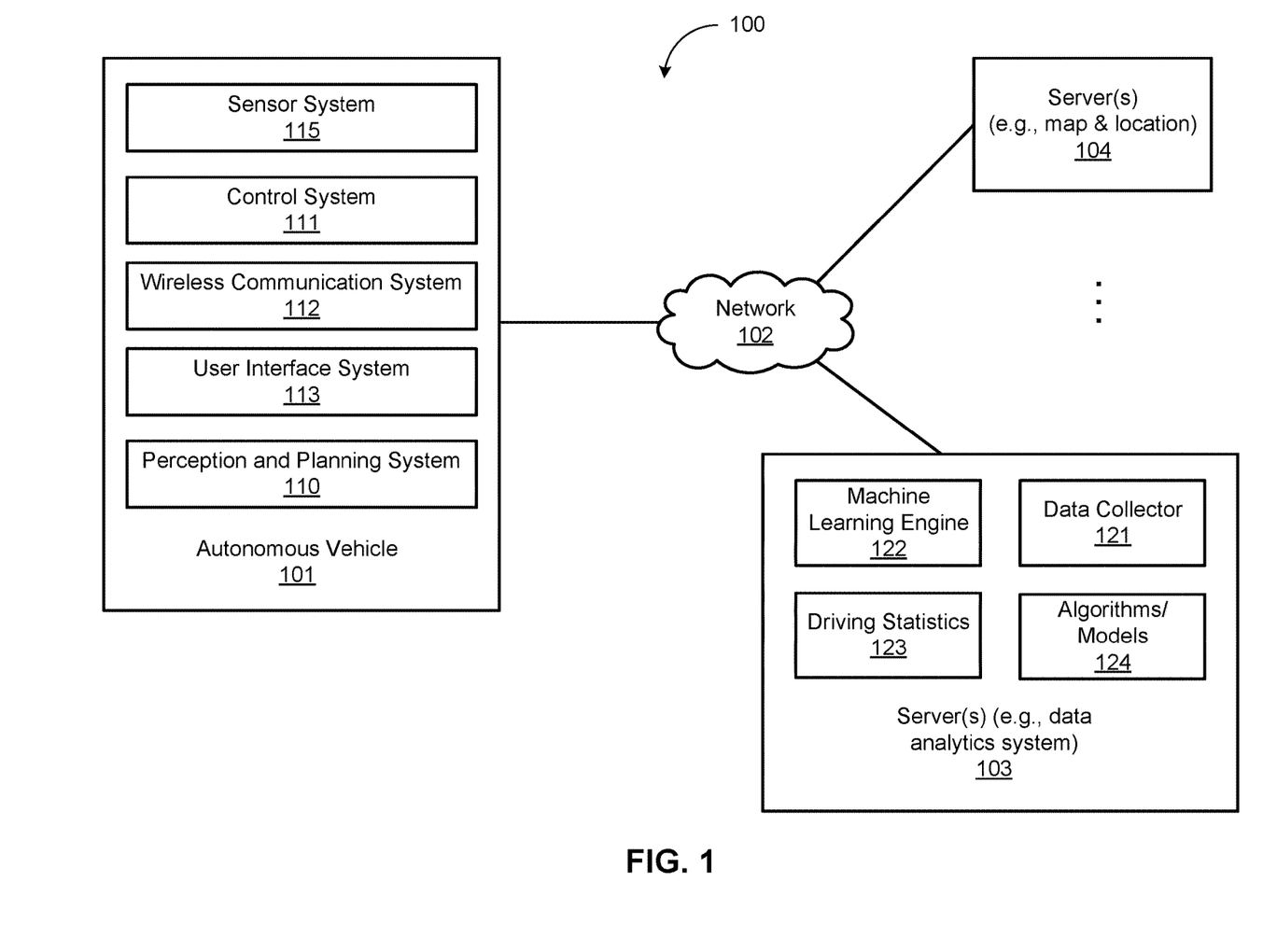
FIG. 1 is a block diagram illustrating a networked system according to some embodiments.

FIG. 1 is a block diagram illustrating an autonomous vehicle network configuration according to some embodiments of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles may be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that may be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
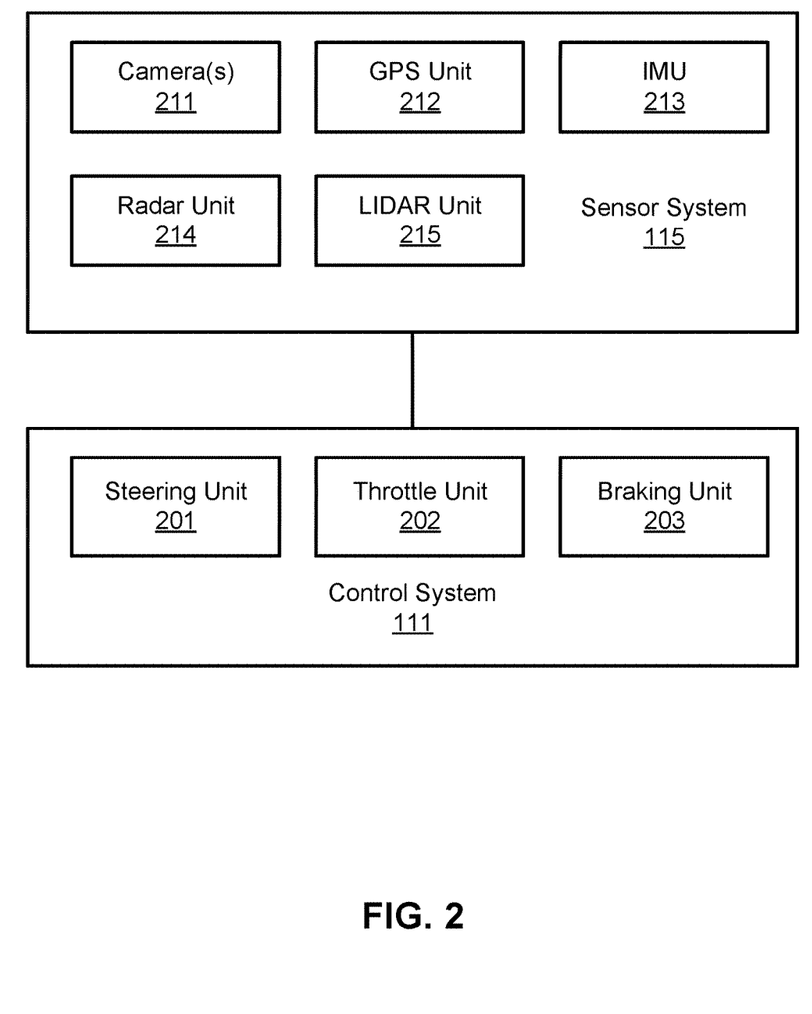
FIG. 2 is a block diagram illustrating an example of an autonomous vehicle according to some embodiments.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In some embodiments, the perception and planning system 110 may not have MPOI information (e.g., map data). For example, the perception and planning system 110 may not have map data for other environments or geographical areas/locations, the perception and planning system 110 may not have map data for an environment or geographical area/location where the autonomous vehicle 101 is currently travelling or located (e.g., the perception and planning system 110 may have map data for one city but may not have map data for another city). In another example, the perception and planning system 110 may not have any map data or MPOI information (e.g., the perception and planning system 110 may not store any map data).

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include an algorithm or model to determine whether a particular sensor or sensors have failed. Algorithms 124 may further include one or more algorithms to drive an ADV using a local or relative coordinate system, in response to a sensor failure. Algorithms 124 may then be uploaded onto ADVs for real-time navigation, for example, as a part of sensor detection algorithms 313 of FIG. 3A to drive the ADVs using a local or relative coordinate system in response to sensor failure.

Figure 3A:
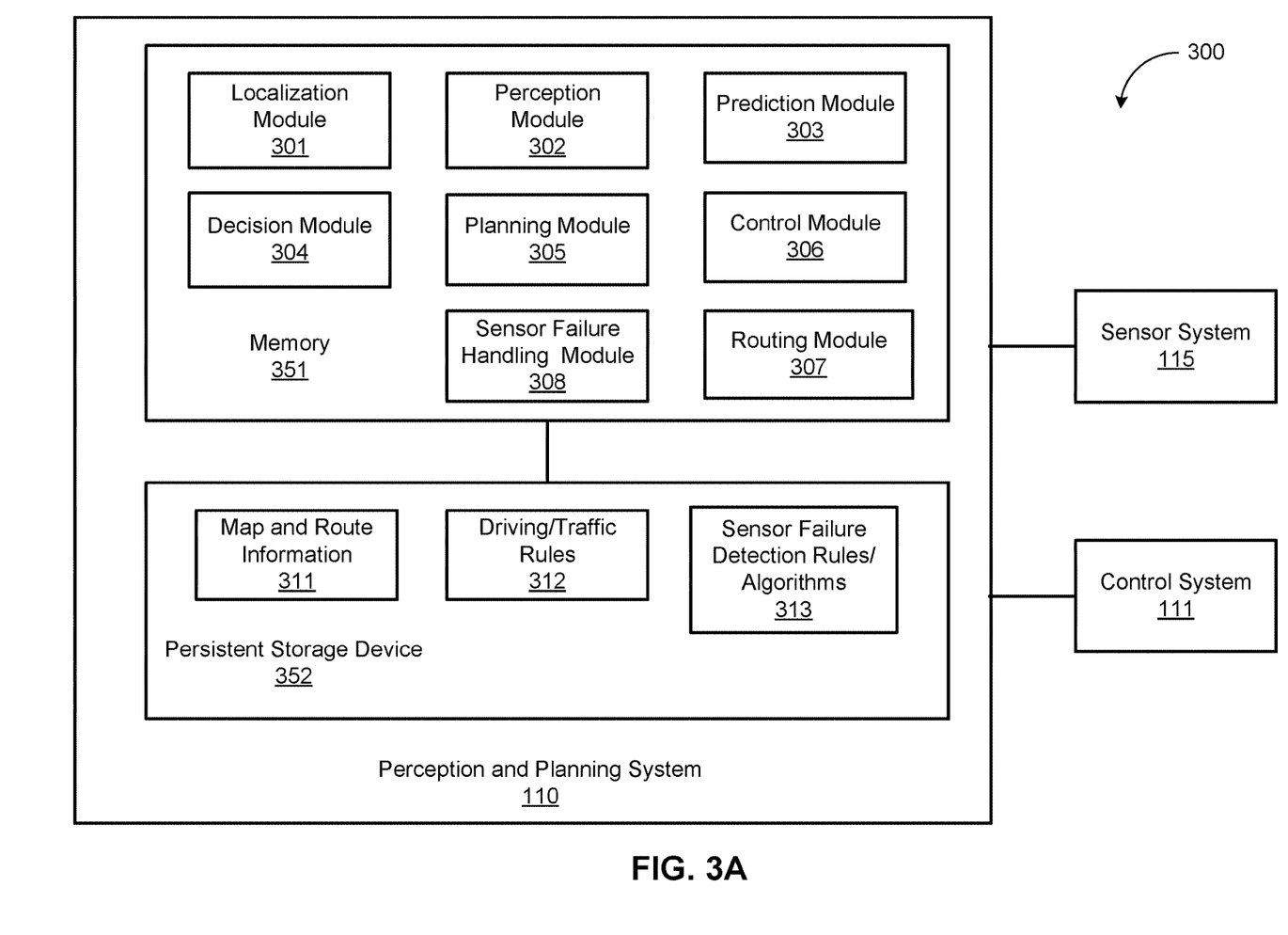
FIGS. 3A-3B are block diagrams illustrating an example of a perception and planning system used with an autonomous vehicle according to some embodiments.
Figure 3B:
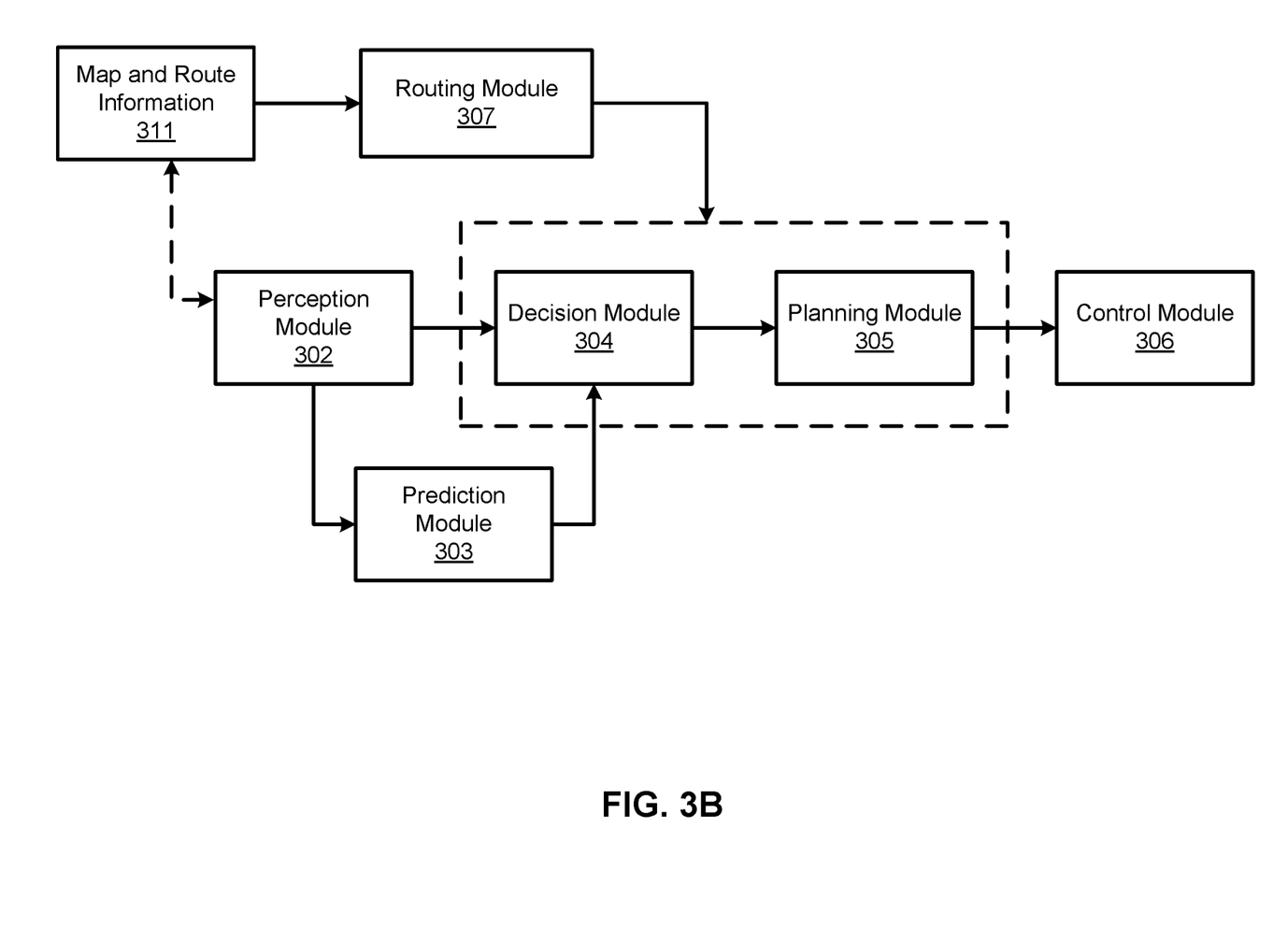

FIGS. 3A and 3B are block diagrams illustrating an example of a perception and planning system used with an autonomous vehicle according to some embodiments. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and sensor failure handling module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server. In one embodiment, the map and route information 311 may have been previously stored in the persistent storage device 352. For example, the map and route information 311 may have been previously downloaded or copied to the persistent storage device 352.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively. In some embodiments, the map/route information 311 for an environment or geographical area/location may be generated on the fly (e.g., generated by the perception module 302) as the autonomous vehicle travels through the environment or geographical area/location, as discussed in more detail below.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Various moving obstacles/objects may move unpredictably. For example, although a pedestrian may be moving along a path, the pedestrian may suddenly change direction (e.g., turn left) or may accelerate/decelerate. This may cause problems when attempting to predict the path of the moving object in order to avoid colliding with, hitting, or striking the moving object. Thus, it may be useful to determine (e.g., calculate, compute, obtain, etc.) an area that includes possible locations where a moving obstacle may move to. This may allow the ADV to increase the probability of avoiding the moving obstacle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. In some embodiments, the map/route information 311 may be generated by the perception module 302, as discussed in more detail below. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps (which may be generated by the perception module 302 or may have been previously stored/downloaded) so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc., in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road may be divided into sections or segments {A, B, and C} to denote three road segments. Three lanes of road segment A may be enumerated {A1, A2, and A3}. A reference route is generated by generating reference points along the reference route. For example, for a vehicular lane, routing module 307 can connect midpoints of two opposing curbs or extremities of the vehicular lane provided by a map data (which may be generated by the perception module 302 or may have been previously stored/downloaded). Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Sensor failure handling module 308 can be configured to detect a failure in a GPS sensor or in a LIDAR sensor, and send informs other modules 301-307, so that at least one of the modules can handle the sensor failure.

Sensor Failure Handling System

Figure 4:
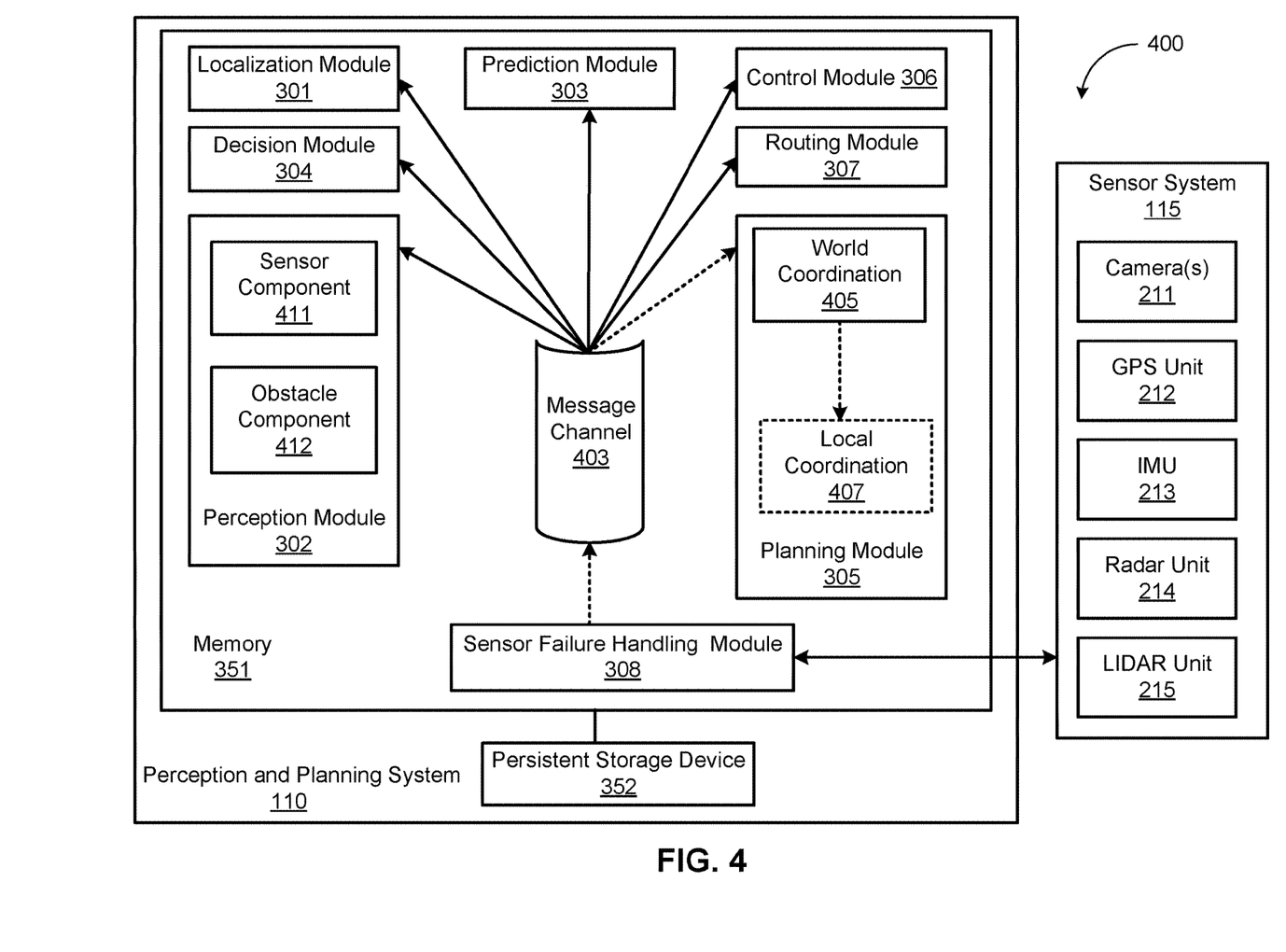
FIG. 4 illustrates an example sensor failure handling system for use in an ADV according to one embodiment.

FIG. 4 illustrates an example sensor failure handling system for use in an ADV according to one embodiment. System 400 includes sensor failure handling module 308, which is configured to monitor a temperature of the ADV, CPU utilization, memory utilization and disk utilization on a computing device in the ADV, and a plurality of sensors in the ADV. The sensors that are monitored by sensor failure handling module 308 include, but they are not limited to, cameras 211, GPS unit 212, IMU 213, Radar unit 214, and LIDAR unit 215.

In one embodiment, the plurality of sensors can generate sensor data. Cameras 211 can capture or record images. Radar unit 214 can determine the location, range, angle, and/or velocity of objects around the ADV using radio waves (e.g., radio-frequency waves or signals). LIDAR unit 215 can determine the location, range, angle, and/or velocity of objects around the ADV using light (e.g., laser light). GPS unit 212 can determine the location (e.g., physical or geographical location) of the ADV. The sensor data generated by GPS unit 212 may be GPS data (which may be referred to as GPS coordinates).

In one embodiment, the sensor data may indicate information about the environment or geographical area/location in which the ADV is currently located or travelling. For example, the sensor data may indicate the locations and/or layouts of objects (e.g., pedestrians, vehicles, barricades, obstacles, barriers, lane lines, signs, traffic lights, etc.). In another example, the sensor data may indicate road conditions for the environment or geographical area (e.g., whether the road is a dry road, wet road, smooth road, bumpy road, etc.). In a further example, the sensor data may indicate weather conditions for the environment or geographical area (e.g., the temperature, whether there is rain, wind, snow, hail, etc.).

In one embodiment, obstacle component 412 may detect one or more moving or static obstacles based on the sensor data obtained/received by sensor component 411. For example, obstacle component 412 may analyze the images or video (e.g., video data) captured by the camera to identify moving obstacles that are in the geographical area where the ADV is located/travelling. In another example, obstacle component 412 may analyze radar data to identify obstacles that are in the geographical area where the ADV is located/travelling. In a further example, obstacle component 412 may analyze LIDAR data to identify obstacles that are in the geographical area where the ADV is located/travelling.

In one embodiment, map component 412 may use various techniques, methods, algorithms, operations, etc., to generate the identifying moving obstacles based on the sensor data. For example, obstacle component 412 may use image or video processing/analysis techniques or algorithms to identify obstacles based on the video data. In another example, obstacle component 412 may use various object detection techniques or algorithms to identify obstacles based on radar and/or LIDAR data. The examples, implementations, and/or embodiments described may use various types of sensor data and/or various functions, techniques, methods, algorithms, operations, etc., to identify obstacles. For example, obstacle component 412 may use machine learning, artificial intelligence, statistical models, neural networks, clustering techniques, etc.

In one embodiment, sensors 211-215, when functioning properly, can generate sensor data for use by the ADV to navigate in a world coordination as an absolute coordination system. Planning module 305 can navigate the ADV using sensor data that is combined from LIDAR unit 215, GPS unit 212, and cameras 211.

When a GPS sensor or a LIDAR sensor does not work as expected, planning module 305 may experience problems in navigating the ADV in the world coordination. For example, when GPS signals are weak or are blocked by buildings, the GPS sensor may generate GPS data with position standard deviations larger than a predetermined threshold, and accordingly, planning module 305 may not be able to navigate the ADV accurately using the GPS data and map data in the world coordination. Similarly, perception module 302 may not receive any sensor data from a LIDAR or experience a longer delay in receiving sensor data, which can prevent planning module 305 from navigating the ADV accurately in the world coordination.

In one embodiment, sensor failure handling module 308 can detect indications that one or more of the sensors 211-215 do not work as expected and sends a message indicating the failure to message channel 403 that is subscribed to by modules 301, 302, 303, 304, 305, 306 and 307 in the ADV. At least one of the subscribing modules, for example, planning module 305, can switch the ADV from navigating in a world coordination 405 to local coordination 407 when receiving the message indicating the failure.

Local coordination 407 is a relative coordination to a current location of the ADV within a lane in which the ADV is driving. After the coordination switch, planning module 305 can navigate the ADV and plan a trajectory to drive the ADV within the lane based on the local coordination without using absolute coordinate information of the world coordination.

In one embodiment, when a single camera functions, planning module 305 can use sensor data from the camera to detect and track a particular lane, and slow down until human disengagement. When two or more cameras function, planning module 305 can use sensor data from the two or more cameras to detect and track a plurality of lanes, and pull up on a side of a road.

Figure 5:
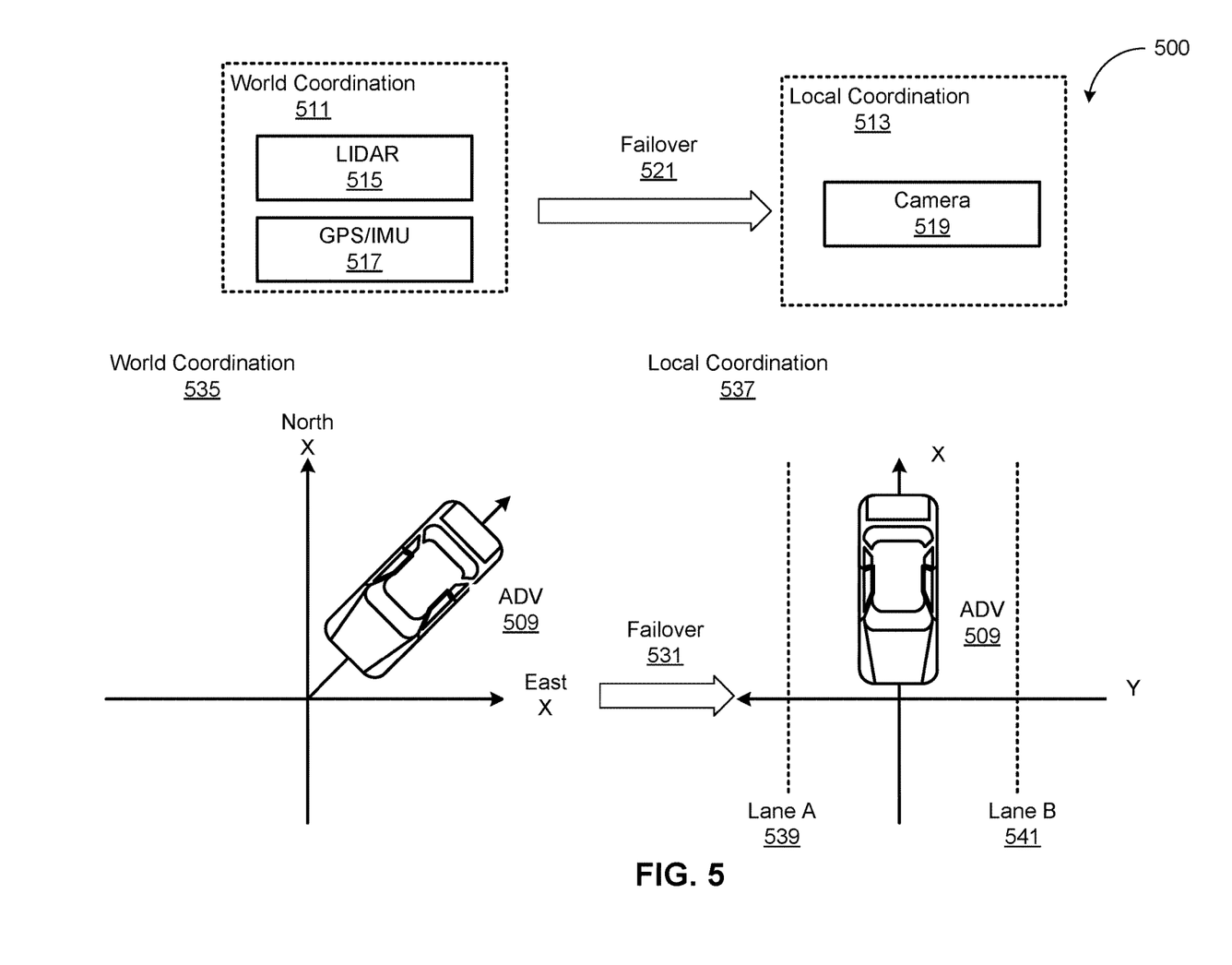
FIG. 5 is a diagram illustrating a switch from a world coordination system to a local coordination system according to one embodiment.

FIG. 5 is a diagram illustrating a switch from a world coordination system to a local coordination system according to one embodiment. In system 500 as shown in FIG. 5, in the event of a failure in either a LIDAR 515 sensor or a GPS sensor 517 in ADV 509, camera-based obstacle detection and lane mark detection can be used for navigating the ADV in a local coordination 537, instead of a world coordination 535 in which the ADV was originally navigating.

In the world coordination 535, the ADV relies on sensor data from LIDAR 515 and GPS/IMU 517 for navigation. The sensor data can provide longitudes and latitudes to describe positions and orientations/directions of the ADV.

In one embodiment, in response to the failure in a LIDAR sensor 515 and/or a GPS sensor 517, the ADV fails over via paths 521 and 531 from the world coordination 511 to the local coordination 513, in which the ADV can rely on obstacle detection based on camera 519, and detections of marks of lanes (e.g., lane A 539 and lane B 541) for navigation.

When navigating in an absolute coordinate system, based on the perception data, perception module (or other modules such as localization module 301, routing module 307) determine the location of the ADV and location of each of the obstacles (e.g., other vehicles, bikers, street signs, pedestrians, buildings, etc.) perceived using the absolute coordinate information, such as GPS and IMU data. The precise locations (e.g., absolute x, y coordinates) of the ADV and the obstacles can be determined by mapping sensor data describing the ADV and the obstacles to a map (e.g., a high-definition or HD map). The absolute location information of the ADV and obstacles are utilized by prediction module 302 to predict how the obstacles will move in the near future and utilized by decision module 304 to determine how the ADV should do in view of the current location of the ADV.

Planning module 305 then plans and generates a trajectory for guiding the ADV to move for a next driving cycle based on the prediction and decision performed by prediction module 203 and decision module 304. Specifically, planning module 305 maps the absolute locations of the obstacles and the ADV to a station-lateral (SL) map and a station-time (ST) graph for planning the trajectory. An SL map includes information describing a location of each obstacle relative to a current location of the ADV. In an SL map, an X axis represents a longitudinal distance between the current location of the ADV and each obstacle. A Y axis represents a lateral distance (e.g., left or right) between the current location of ADV (or the reference line of the lane) and each obstacle at different locations of the ADV. In an ST graph, an X axis represents time, while Y axis represents a distance between each obstacle and the ADV at different points in time. Based on the SL map and the ST graph, planning module 305 can plan a trajectory to navigate around to avoid any dangerous conditions (e.g., collision) with respect to the obstacles shown in the SL map and ST graph.

When some sensors (e.g., GPS, IMU, LIDAR, RADAR) fail, the absolute location information of the ADV and the obstacles are unavailable or invalid. In response to the failure, all of the modules subscribing the failure message are configured to switch from the absolute coordinate system to a local/relative coordinate system. In such a situation, perception module 302 and/or localization module 301 determine the location of the obstacles based on the sensor data captured by other sensors such as cameras. Specifically, an image recognition may be performed to recognize the obstacles and a distance and viewing angle between the cameras of the ADV and the obstacles are measured. In addition, the lane configuration may also be determined based on the images.

Based on the measured distance and viewing angle, a longitudinal distance and a lateral distance between the ADV and the obstacle can be calculated. As a result, a relative location of each obstacle with respect to the current location of the ADV can be determined. The lane configuration can include information concerning a number of lanes in each direction, the lane width, the distance between the ADV and the boundary of the lanes, etc. The relative locations of the obstacles can then be mapped to an SL map and an ST graph to allow planning module 305 to generate a trajectory to move around the obstacles without dangerous conditions.

As such, system 500 provides an automatic, swift and seamless switch from navigating the ADV in the world coordination to the local coordination in the event of a sensor failure that negatively impacts the navigation of the ADV in the world coordination.

After the coordination switch, according to one embodiment, the camera-based obstacle detection and lane mark detection would enable the ADV to drive safely in the local coordination until human dis-engagement or until the ADV is parked along a road side. Alternatively, the ADV may simply follow the lane using the local or relative coordinate system.

Figure 6:
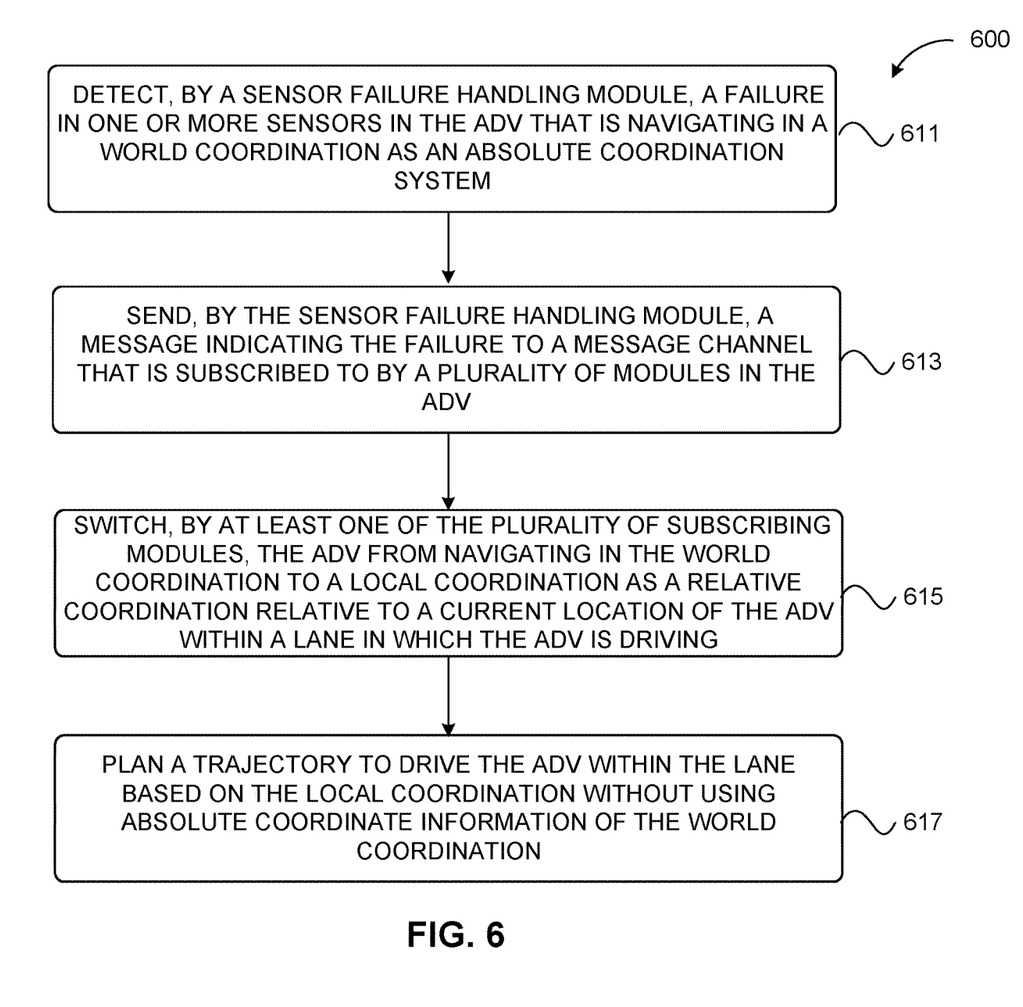
FIG. 6 is a flow diagram illustrating an example of process for handling sensor failures in an autonomous vehicle (e.g., an ADV) according to one embodiment.

FIG. 6 is a flow diagram illustrating an example of process 600 for handling sensor failures in an autonomous vehicle (e.g., an ADV) according to one embodiment. Process 600 may be performed by processing logic which may include software, hardware, or a combination thereof. In one embodiment, process 600 may be performed by one or more of localization module 301, perception module 302, prediction module 303, decision module 304, planning module 305, control module 306, routing module 307, and sensor failure handling module 308, as illustrated in FIG. 3A and FIG. 4.

Referring to FIG. 6, in operation 611, a sensor failure module is provided in the ADV to detect a sensor failure in one or more sensors in the ADV that is navigating in a world coordination as an absolute coordination system.

In operation 613, in response to detecting the failure in the one or more sensors, the sensor failure module sends a message indicating the failure to a message channel that is subscribed to by a plurality of modules in the ADV.

In operation 615, at least one subscribing module, when receiving the message, operates to switch the ADV from navigating in the world coordination to a local coordination that is relative to a current location of the ADV within a lane in which the ADV is driving.

In operation 615, the at least one subscribing modules plans a trajectory to drive the ADV within the lane based on the local coordination without using absolute coordinate information of the world coordination.

Note that some or all of the components as shown and described above may be implemented in software, hardware, or a combination thereof. For example, such components may be implemented as software installed and stored in a persistent storage device, which may be loaded and executed in a memory by a processor (not shown) to carry out the processes or operations described throughout this application. Alternatively, such components may be implemented as executable code programmed or embedded into dedicated hardware such as an integrated circuit (e.g., an application specific IC or ASIC), a digital signal processor (DSP), or a field programmable gate array (FPGA), which may be accessed via a corresponding driver and/or operating system from an application. Furthermore, such components may be implemented as specific hardware logic in a processor or processor core as part of an instruction set accessible by a software component via one or more specific instructions.

Figure 7:
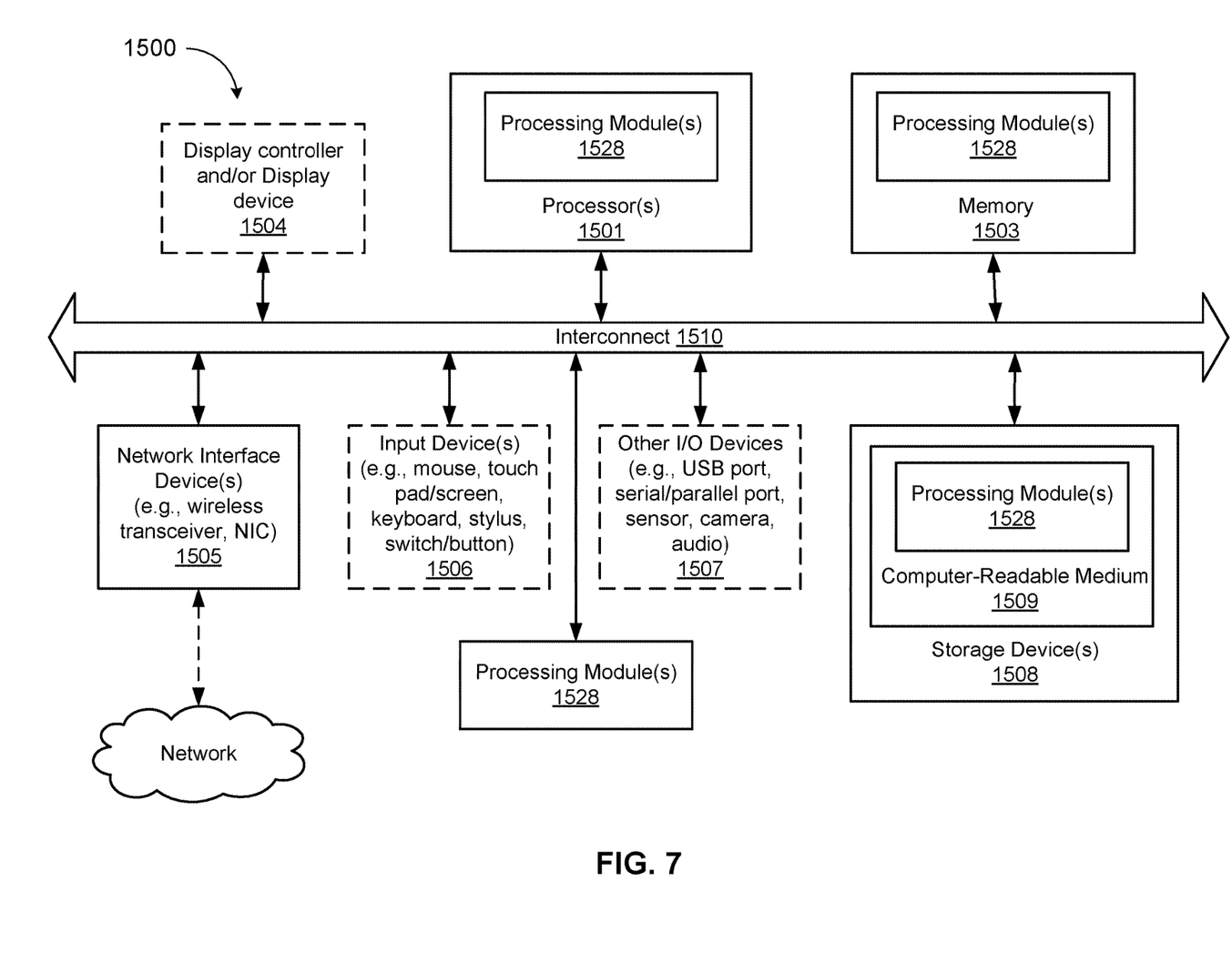
FIG. 7 is a block diagram illustrating a data processing system according to some embodiments.

FIG. 7 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor may be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment may be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications may be loaded in memory 1503 and executed by processor 1501. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein may be implemented as discrete hardware components or integrated in the functionality of hardware components such as ASICS, FPGAs, DSPs or similar devices. In addition, processing module/unit/logic 1528 may be implemented as firmware or functional circuitry within hardware devices. Further, processing module/unit/logic 1528 may be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of operating an autonomous driving vehicle (ADV), the computer-implemented method comprising:
   detecting, by a sensor failure handling module, a failure in one or more sensors in the ADV that is navigating in a world coordinate system as an absolute coordinate system;
   broadcasting, by the sensor failure handling module, a message indicating the failure to a plurality of autonomous driving modules in the ADV through a message channel, wherein each of the plurality of autonomous driving modules subscribes to the message channel;
   in response to receiving the message, switching, by the plurality of subscribing autonomous driving modules, the ADV from navigating in the world coordinate system to navigating in a local coordinate system, which is relative to a current location of the ADV within a lane in which the ADV is driving; and
   planning, by the plurality of subscribing autonomous driving modules, a trajectory based on sensor data from one or more cameras mounted on the ADV, to drive the ADV within the lane based on the local coordinate system without using sensor data from a light detection and ranging (LIDAR) sensor or a global positioning system (GPS) sensor, wherein the ADV determines, based on a number of cameras that are still functioning, whether to track the lane and slow down until human disengagement, or track a plurality of lanes and pull up on a side of a road.

2. The computer-implemented method of claim 1, wherein the plurality of subscribing autonomous driving modules includes a planning module.

3. The computer-implemented method of claim 1, wherein detecting the failure in the one or more sensors comprises detecting no data received from a sensor, a longer delay in receiving data from the sensor, or a standard deviation in data generated by the sensor, wherein the standard deviation is greater than a predetermined threshold.

4. The computer-implemented method of claim 2, wherein prior to the detecting of the failure in the one or more sensors the planning module uses sensor data that is combined from the LIDAR sensor, the GPS sensor, and the one or more cameras.

5. The computer-implemented method of claim 1, wherein when one of the one or more cameras is functioning, the ADV uses sensor data from the camera to detect and track the lane, and slow down until the human disengagement.

6. The computer-implemented method of claim 1, wherein when two or more cameras of the one or more cameras are functioning, the ADV uses sensor data from the two or more cameras to detect and track the plurality of lanes, and pull up on the side of the road.

7. The computer-implemented method of claim 1, wherein the sensor failure handling module is configured to monitor a temperature of the ADV, CPU utilization, memory utilization and disk utilization on a computing device in the ADV, and a plurality of sensors in the ADV.

8. A non-transitory machine-readable medium having instructions stored therein, which when executed by a processor, cause the processor to perform operations of operating an autonomous driving vehicle (ADV), the operations comprising:
   detecting, by a sensor failure handling module, a failure in one or more sensors in the ADV that is navigating in a world coordinate system as an absolute coordinate system;
   broadcasting, by the sensor failure handling module, a message indicating the failure to a plurality of autonomous driving modules in the ADV through a message channel, wherein each of the plurality of autonomous driving modules subscribes to the message channel;
   in response to receiving the message, switching, by the plurality of subscribing autonomous driving modules, the ADV from navigating in the world coordinate system to navigating in a local coordinate system, which is relative to a current location of the ADV within a lane in which the ADV is driving; and
   planning, by the plurality of subscribing autonomous driving modules, a trajectory based on sensor data from one or more cameras mounted on the ADV, to drive the ADV within the lane based on the local coordinate system without using sensor data from a light detection and ranging (LIDAR) sensor or a global positioning system (GPS) sensor, wherein the ADV determines, based on a number of cameras that are still functioning, whether to track the lane and slow down until human disengagement, or track a plurality of lanes and pull up on a side of road.

9. The non-transitory machine-readable medium of claim 8, wherein the plurality of subscribing autonomous driving modules includes a planning module.

10. The non-transitory machine-readable medium of claim 8, wherein detecting the failure in one or more sensors comprises detecting no data received from a sensor, a longer delay in receiving data from the sensor, or a standard deviation in data generated by the sensor, wherein the standard deviation is greater than a predetermined threshold.

11. The non-transitory machine-readable medium of claim 9, wherein prior to the detecting of the failure in one or more sensors the planning module uses sensor data that is combined from the LIDAR sensor, the GPS sensor, and the one or more cameras.

12. The non-transitory machine-readable medium of claim 8, wherein when one of the one or more cameras is functioning, the ADV uses sensor data from the camera to detect and track the lane, and slow down until the human disengagement.

13. The non-transitory machine-readable medium of claim 8, wherein when two or more cameras of the one or more cameras are functioning, ADV uses sensor data from the two or more cameras to detect and track the plurality of lanes, and pull up on the side of the road.

14. The non-transitory machine-readable medium of claim 8, wherein the sensor failure handling module is configured to monitor a temperature of the ADV, CPU utilization, memory utilization and disk utilization on a computing device in the ADV, and a plurality of sensors in the ADV.

15. A system for handling sensor failures in an autonomous driving vehicle (ADV), comprising:
- a processor; and
- a memory coupled to the processor to store instructions, which when executed by the processor, cause the processor to perform operations, the operations comprising:
  - detecting, by a sensor failure handling module, a failure in one or more sensors in the ADV that is navigating in a world coordinate system as an absolute coordinate system;
  - broadcasting, by the sensor failure handling module, a message indicating the failure to a plurality of autonomous driving modules in the ADV through a message channel, wherein each of the plurality of autonomous driving modules subscribes to the message channel;
  - in response to receiving the message, switching, by the plurality of subscribing autonomous driving modules, the ADV from navigating in the world coordinate system to navigating in a local coordinate system, which is relative to a current location of the ADV within a lane in which the ADV is driving; and
  - planning, by the plurality of subscribing autonomous driving modules, a trajectory based on sensor data from one or more cameras mounted on the ADV, to drive the ADV within the lane based on the local coordinate system without using sensor data from a light detection and ranging (LIDAR) sensor or a global positioning system (GPS) sensor, wherein the ADV determines, based on a number of cameras that are still functioning, whether to track the lane and slow down until human disengagement, or track a plurality of lanes and pull up on a side of road.

16. The system of claim 15, wherein the plurality of subscribing autonomous driving modules includes a planning module.

17. The system of claim 15, wherein detecting the failure in one or more sensors comprises detecting no data received from a sensor, a longer delay in receiving data from the sensor, or a standard deviation in data generated by the sensor, wherein the standard deviation is greater than a predetermined threshold.

18. The system of claim 16, wherein prior to the detecting of the failure in one or more sensors the planning module uses sensor data that is combined from the LIDAR sensor, the GPS sensor, and the one or more cameras.

19. The system of claim 15, wherein when one of the one or more cameras is functioning, the ADV uses sensor data from the camera to detect and track the lane, and slow down until the human disengagement.

20. The system of claim 15, wherein when two or more cameras of the one or more cameras are functioning, ADV uses sensor data from the two or more cameras to detect and track the plurality of lanes, and pull up on the side of the road.

21. The system of claim 15, wherein the sensor failure handling module is configured to monitor a temperature of the ADV, CPU utilization, memory utilization and disk utilization on a computing device in the ADV, and a plurality of sensors in the ADV.

* * * * *